Patented Mar. 10, 1953

2,631,171

UNITED STATES PATENT OFFICE 2,631,171

MANUFACTURE OF HEXACHLOROCYCLO-PENTADIENE

Jack S. Newcomer, Salt Lake City, Utah

No Drawing. Application August 27, 1947,
Serial No. 770,945

11 Claims. (Cl. 260—648)

This invention relates to a novel two-step process for the preparation of polychlorinated compounds, and particularly to a method of manufacturing highly chlorinated aliphatic and alicyclic olefins containing five and seven carbon atoms.

This invention has as an object to provide a method for the manufacture of highly chlorinated aliphatic and alicyclic olefins containing five and seven carbon atoms and from eight to twelve chlorine atoms per molecule. A further object is to provide a method for the manufacture of hexachlorocyclopentadiene by the pyrolysis of such highly chlorinated olefins. Further objects will appear hereinafter.

I have found that I can obtain highly chlorinated aliphatic and alicyclic olefins containing five and seven carbon atoms and from eight to twelve chlorine atoms per molecule by condensing carbon tetrachloride with trichloroethylene in the presence of a Friedel-Crafts catalyst at temperatures between 30 degrees centigrade and 170 degrees centigrade. I have also found that if such highly chlorinated condensation products, or any portion thereof, is pyrolyzed at temperatures between 280 degrees centigrade and 800 degrees centigrade, I can obtain hexachlorocyclopentadiene and other products which will appear hereinafter.

Hexachlorocyclopentadiene was first prepared by Straus[1] by the chlorination of cyclopentadiene with an alkali metal hypochlorite in strongly alkaline medium. Prins[2] has reported the preparation of hexachlorocyclopentadiene by the condensation of chloroform with trichloroethylene. Finally, Baranauckas[3] has reported the production of hexachlorocyclopentadiene by the chlorination of pentane and other hydrocarbons. In contrast to the methods of Straus and Baranauckas, my method of producing hexachlorocyclopentadiene is not one of chlorination, since neither free chlorine nor any chlorinating agent is employed in my process. Instead, my method is one of condensation and pyrolysis. The pyrolysis step is conducted merely by the application of heat. Therefore, it is entirely different from a chlorination and/or chlorinolysis-type reaction. In contrast to the method of Prins, my method involves a condensation of trichloroethylene and carbon tetrachloride, rather than trichloroethylene and chloroform. In addition, my condensation produces a condensation product of an entirely different nature. In fact, I have not been able to obtain any one of the reaction products by my condensation of trichloroethylene with carbon tetrachloride that Prins has obtained by the condensation of trichloroethylene with chloroform. Furthermore, my condensation produces highly chlorinated olefins free of hexachlorocyclopentadiene, but which are especially suitable for pyrolysis to hexachlorocyclopentadiene.

The condensation of trichloroethylene with carbon tetrachloride to form polychlorinated compounds containing five and seven carbon atoms does not appear in the literature. Prins[4] has reported the preparation of symmetrical heptachloropropane by the condensation of carbon tetrachloride with trichloroethylene at temperatures not exceeding 20 degrees centigrade. Henne[5] has reported the condensation of carbon tetrachloride with trichloroethylene at temperature of 20 degrees centigrade to 30 degrees centigrade to form 49% symmetrical heptachloropropane, 5% tar, and the remainder being unreacted starting materials.

I have condensed carbon tetrachloride with trichloroethylene in the presence of a Friedel-Crafts catalyst at temperatures above 30 degrees centigrade and up to 170 degrees centigrade to obtain a condensation product having a boiling range of about 100 degrees centigrade to 223 degrees centigrade at one millimeter of mercury absolute, and which is free of symmetrical heptachloropropane. My condensation product consists essentially of highly chlorinated olefins containing five and seven carbon atoms. After removal of the catalyst from the condensation product by washing with water or otherwise, I have separated the organic material into seven fractions by effecting fractional distillation at reduced pressures:

Fraction A, B. R. 128°–129° C. at 5 mm. Hg absolute, was identified as octachlorocyclopentene.

Fraction B, B. R. 129°–136° C. at 5 mm. Hg absolute, is an intermediate between fractions A and C.

Fraction C, B. R. 136°–142° C. at 5 mm. Hg absolute, analyzes to have the formula $C_5HCl_9$ and is believed to be 1,1,2,3,3,4,5,5,5-nonachloro-1-pentene.

---

[1] Straus, Kollek, and Heyn, Ber., 63B, 1868–85 (1930).
[2] H. J. Prins, Rec. trav. chim., 65, 455–467 (1946).
[3] C. F. Baranauckas and E. T. McBee, Abstracts of Atlantic City Meeting of Am. Chem. Soc., April 14–18, 1947.

[4] H. J. Prins, J. Pract. Chemie, (2), 89, 417 (1914); D. R. P. 261, 689 (Chem. Zent. (II) 394 (1913).
[5] A. L. Henne and E. C. Ladd, J. Am. Chem. Soc., 60, 2491–5 (1938).

Fraction D, B. R. 142°–162° C. at 5 mm. Hg absolute, is an intermediate between fractions C and E.

Fraction E, B. R. 162°–163° C. at 5 mm. Hg absolute, analyzes to be an unsaturated, derivative of ethylcyclopentane having the formula $C_7Cl_{10}$.

Fraction F, B. R. 163° to 192° C. at 5 mm. Hg absolute, which analyzes to be a mixture of unsaturated derivatives of ethylcyclopentane have the formulas $C_7Cl_{10}$ and $C_7HCl_{11}$.

Fraction G, B. R. 195° to 236° C. at 5 mm. Hg absolute, which consists essentially of higher condensation products.

I prefer to conduct the condensation of carbon tetrachloride with trichloroethylene at temperatures between about 60° to 100° C., which can be accomplished by adding trichloroethylene to a mixture of carbon tetrachloride and aluminum chloride heated on a steam cone to reflux temperature and allowing the reaction to proceed until the evolution of hydrogen chloride ceases. Although the reaction may be conducted initially at temperatures between 30° and 45° C., the latter stages of the condensation are generally performed between 60° and 100° C., to obtain higher yields of the desirable condensation products. Temperatures in excess of 100° C., are obtained by adding a portion of the trichloroethylene at temperatures between 30° and 100° C., distilling off an amount of carbon tetrachloride necessary to allow the reaction mixture to be heated to the desired temperature, and then adding portionwise the remainder of the trichloroethylene. Temperatures between 120° to 170° C., generally result in the production of greater quantities of seven carbon atom and higher condensation products than if the condensation is conducted in the preferred range of 60° to 100° C. The condensation products containing seven and greater carbon atoms pyrolyze to give lower parts by weight of hexachlorocyclopentadiene than that obtained from similar quantities of five carbon atom condensation products.

The ratio of carbon tetrachloride to trichloroethylene is not a limiting factor of this invention. Condensation products suitable for pyrolysis to hexachlorocyclopentadiene are obtained when employing molar ratio of carbon tetrachloride to trichloroethylene varying from 1 to 5 and 17 to 1. I prefer to employ ratios varying from 1 to 2 and 2 to 1. Ratios lower than 1 to 2 produce a condensation product containing increased quantities of compounds having seven and greater carbon atoms. When employing ratios greater than 2 to 1 and up to 17 to 1, the condensation product is very similar in nature to that obtained by employing ratios within the desired range.

The condensation of carbon tetrachloride with trichloroethylene may be performed by heating a mixture of specified amounts of the reactants, or by adding trichloroethylene to a mixture of carbon tetrachloride and the catalyst, or by adding carbon tetrachloride to a mixture of trichloroethylene and the catalyst. I prefer adding trichloroethylene to a mixture of carbon tetrachloride and the catalyst, since the reaction is easily controlled under these conditions and also since it produces a minimum of condensation products containing seven and greater carbon atoms.

Because of its enhanced reactivity I prefer to use aluminum chloride as the Friedel-Crafts catalyst. When the organic reactants have been thoroughly dried, the quantity of aluminum chloride employed is not a critical factor. Under these conditions, I have employed amounts of aluminum chloride varying from catalytic to 0.5 mole with respect to one mole of carbon tetrachloride. I prefer to employ one-fifteenth mole of aluminum chloride per mole of carbon tetrachloride when using commercial reagents.

I have found that pyrolysis of the crude condensation product, previously described, produces yields of hexachlorocyclopentadiene up to 75%. The pyrolysis of highly chlorinated hydrocarbons to hexachlorocyclopentadiene had been hitherto unknown and was a completely unpredictable phenomenon. It is to be emphasized that this pyrolysis is conducted merely by the application of heat to the condensation product and is not to be confused with a high-temperature chlorination or chlorinolysis process. Furthermore, no free chlorine nor chlorination agent is necessary at any time in my process. Although the pyrolysis may be conducted in the presence of free chlorine, this offers no distinct advantages.

Pyrolysis of the crude condensation product may be conducted at temperatures between 280° and 800° C., preferably at temperatures between 460° and 550° C. By conducting the pyrolysis at temperatures between 280° and 300° C., incomplete conversion to hexachlorocyclopentadiene occurs, thereby necessitating recycle steps. As the temperature is increased above 300° C., the conversion to hexachlorocyclopentadiene likewise increases and approaches the value of 75%, as is obtained when operating within the desired range of 460° to 550° C. Temperatures ranging from 600° to 780° C. have been employed, but offer no advantage over the preferred range.

The pyrolysis may be conducted by various methods, and the method of pyrolysis is not to be construed as a limiting factor of this invention. For example, by placing the crude condensation product in an ordinary distilling flask and applying heat thereto at atmospheric pressures, the mixture boils with the simultaneous distillation of carbon tetrachloride, tetrachloroethylene, hexachlorocyclopentadiene, and hexachlorobenzene. This liquid phase method of pyrolysis is not preferred since there is a tendency toward a small amount of tar formation and also because an intermediate pyrolytic product is produced, which is believed to have the formula $C_7Cl_8$ (B. R. 140° to 145° C. at 8–9 mm. Hg absolute). I have found that this intermediate can be pyrolyzed to hexachlorocyclopentadiene at temperatures between 460° and 550° C. I prefer to pyrolyze the crude condensation mixture in the vapor phase in one step by conducting it into a zone maintained between about 460° and 550° C. Under these conditions, there is negligible carbonization and only small quantities of intermediary pyrolytic products are produced.

In order to more completely investigate the nature of the pyrolysis, I have separated the condensation mixture into seven fractions, as previously described, and have pyrolyzed each fraction individually and obtained hexachlorocyclopentadiene in each case.

This invention is illustrated, but not limited, by the following examples:

EXAMPLE 1

Part a.—During a period of 4 hrs. 10 min., 10 moles of commercial trichloroethylene was added to a vigorously stirred mixture of 10 moles of carbon tetrachloride and 0.6 mole of anhydrous aluminum chloride maintained at reflux temperature on a steam cone. During the course of the condensation, considerable evolution of hydrogen chloride occurs and the reaction mixture changes in color from yellow to deep brown. After all the trichloroethylene had been added, the reaction was allowed to proceed for an additional 45 min., at which time the evolution of hydrogen chloride had almost ceased. The reaction mixture was then cooled, washed with water, and dried to give an organic product which was separated into 4.1 moles of carbon tetrachloride and 1139 g. of condensation product having a boiling range of 100° to 223° C. at 1 to 2 millimeters of mercury absolute.

*Part b.*—During a period of 5 hrs., a sample (512 g.) of the condensation product, having a boiling range of 100° to 223° C., at 1 to 2 millimeters of mercury absolute, was passed at a uniform rate through a Pyrex tube (75 cm. in length and 1.5 cm. in diameter, packed with glass helices) at a temperature of 490° to 510° C. The resulting product (466 g.) was diluted with 100 ml. of acetone, chilled, and filtered to obtain 39 g. of hexachlorobenzene (M. P. 226° C.). After removal of the acetone, the filtrate was fractionally distilled at 740 millimeters of mercury absolute to obtain 85 g. of a mixture of carbon tetrachloride and tetrachloroethylene, and 332 g. of hexachlorocyclopentadiene (B. P. 228°–229° uncorrected).

Anal. calcd. for $C_5Cl_6$: Cl, 77.9, mol. wt. 272. Found: Cl, 77.8, 77.9 mol. wt. 270, 268.

*Part c.*—From a similar experiment as performed in Part *a*, the condensation product (1135 g.), having a boiling range of about 100° to 223° C., at 1 to 2 millimeters of mercury absolute, was brought to a boil by heating in a Claisen flask at 740 millimeters of mercury absolute and heated to effect gentle distillation. The distillation was discontinued when sublimation of hexachlorobenzene began to plug the system. The residue was a thick tar (66 g.). The clear yellow distillate was washed with water, 5% sodium bicarbonate solution, dried, and fractionally distilled to obtain carbon tetrachloride (22 g.), tetrachloroethylene (141 g.), hexachlorocyclopentadiene (267 g., B. P. 101° C. at 8 to 9 millimeters of mercury absolute), and a fraction (589 g., B. R. 140° to 145° C. at 8 to 9 millimeters of mercury absolute) which analyzed to be a mixture of octachlorocyclopentene (M. P. 39° C.) and a liquid having the formula $C_7Cl_8$. This latter fraction was then pyrolyzed at 490° to 510° C., similarly as described in Part *b*, to obtain 421 g. of hexachlorocyclopentadiene.

EXAMPLE 2

A sample of the condensation product (900 ml.), prepared as described in Example 1, Part *a*, was fractionally distilled at 5 millimeters of mercury absolute to obtain the following fractions:

Fraction A, B. P. 128° to 129° C., 345 ml., M. P. 39° C., 83.5% Cl.

Fraction B, B. R. 129° to 136° C., 75 ml.

Fraction C, B. R. 136° to 142° C., 115 ml. 83.4, 83.7% Cl, converted to a glass by cooling to −35° C.

Fraction D, B. R. 142° to 162° C., 7 ml.

Fraction E, B. P. 162° to 163° C., 203 ml., 80.7, 80.8% Cl.

Fraction F, B. R. 163° to 195° C., 95 ml., 81.6% Cl.

Fraction G, B. R. 195° to 236° C., 47 ml.

In addition to these analytical data, fraction A was identified as octachlorocyclopentene by obtaining no depression upon determining the melting point of a mixture of this material and authentic octachlorocyclopentene. Fraction C was established as nonachloropentene by pyrolyzing it to hexachlorocyclopentadiene with the simultaneous production of only very small quantities of organic by-products. Fraction E is an unsaturated derivative of ethylcyclopentane, having the formula $C_7Cl_{10}$. This $C_7Cl_{10}$ was synthesized in a different manner; namely, by the action of aluminum chloride on dodecachloro-3-ethyl-1-pentene. Fraction F is a mixture of unsaturated derivatives of ethyl-cyclopentane having the formulas $C_7Cl_{10}$ and $C_7HCl_{11}$. Fractions B and D are intermediates. Fraction G consists essentially of higher condensation products.

EXAMPLE 3

*Part a.*—A sample (200 g.) of each of the seven fractions, obtained similarly as described in Example 2, was pyrolyzed at temperatures of 490° to 510° C., using the equipment and technic described in Example 1, Part *b*. Fractions A to G, inclusively, produced hexachlorocyclopentadiene in yields of 92%, 87%, 84%, 79%, 76%, 69%, and 24%, respectively.

*Part b.*—A sample of the condensation product, obtained as described in Example 1, Part *a*, was fractionally distilled to remove octachlorocyclopentene at reduced pressures. The higher boiling residue (480 g., B. R. 105° to 227° C., at 2 millimeters of mercury absolute) was heated in a Claisen flask at atmospheric pressure to effect distillation of organic material. At the beginning, the mixture turns dark and then resumes its initial yellow to cherry-red color with the simultaneous distillation of pyrolytic products. The distillate was found to contain 5% by weight of carbon tetrachloride, 23% of tetrachloroethylene, 36% of hexachlorocyclopentadiene, and 29% of a fraction having a boiling range essentially from 142–144° C. at 8 to 9 millimeters of mercury absolute and believed to have the formula $C_7Cl_8$.

EXAMPLE 4

During a period of 2 hrs. 40 min., 4 moles of trichloroethylene was added to a mixture of 4 moles of carbon tetrachloride and 0.3 mole of anhydrous aluminum chloride at 40° to 43° C. The temperature was maintained at 40° to 43° C., for an addition 0.5 hr. and then heated to 80° to 85° C., until the evolution of hydrogen chloride had ceased. This required 2 hrs. 25 min. The reaction mixture was then cooled to 40° C. and 4 moles of trichloroethylene was added to the stirred reaction mixture during a period of 3 hrs. at 35° to 40° C. The dark reaction mixture was washed with water, dried, and pyrolyzed at 490° to 510° C., employing the method described in Example 1, Part *b*. The pyrolytic products were found to contain 532 g. of hexachlorocyclopentadiene, 98 g. of tetrachloroethylene, 15 g. of carbon tetrachloride, and 50 g. of hexachlorobenzene.

EXAMPLE 5

A sample (400 g.) of the condensation product prepared as described in Example 4 was fractionally distilled at 3 millimeters of mercury absolute. A fraction of nonachloropentene (243 g., B. R. 125° to 128° C.) was obtained. The residue having a boiling range in excess of 160° C., at 3 mm. of Hg absolute was found to contain 83.1% Cl and is believed to consist essentially of dodecachloro-3-ethyl-1-pentenes having the formula $C_7H_2Cl_{12}$.

Since many widely different embodiments of this invention are apparent and may be made without departing from the spirit and scope thereof, it is understood that this invention is not limited to the specific embodiments thereof, except as defined in the appended claims.

I claim:

1. In the method of manufacturing chlorinated hydrocarbons having 5–7 carbon atoms and from 8–12 chlorine atoms per molecule in high concentration in the reaction product, the step of slowly introducing trichlorethylene over an extended period of time into carbon tetrachloride in the molar ratio of 5:1 to 1:17 while refluxing at elevated temperature in the presence of a Friedel-Crafts catalyst with the temperature during the final stages of the reaction being between 60–170° C.

2. In the method of manufacturing chlorinated hydrocarbons having from 5–7 carbon atoms and from 8–12 chlorine atoms per molecule in high concentration in the reaction product, the steps of slowly adding trichloroethylene over an extended period of time to carbon tetrachloride in the molecular ratio of 5:1 to 1:17 in the presence of a Friedel-Crafts catalyst, heating the mixture to reflux temperature during the addition to effect a condensation reaction and then continuing to heat the mixture subsequent to addition to a temperature in the final stages of the reaction within the range of 60–170° C. until the evolution of hydrogen chloride gases substantially ceases.

3. In the method of manufacturing chlorinated hydrocarbons having from 5–7 carbon atoms and from 8–12 chlorine atoms per molecule in high concentration in the reaction product, the steps of slowly introducing trichlorethylene over an extended period of time into carbon tetrachloride in the molecular ratio of 2:1 to 1:2 in the presence of a Friedel-Crafts catalyst, maintaining the mixture in a constant state of agitation, and heating the mixture during the addition to reflux temperature and continuing to heat the mixture after addition of the trichlorethylene to a temperature which in the final stages of reaction reaches 6–170° C. until the evolution of hydrogen chloride gases substantially ceases.

4. In the method of manufacturing chlorinated hydrocarbons having from 5–7 carbon atoms and from 8–12 chlorine atoms in high concentration in the reaction product, the steps of slowly introducing trichlorethylene over an extended period of time into carbon tetrachloride in the molecular ratio of 2:1 to 1:2 while heating to reflux temperature to effect condensation reaction in the presence of a Friedel-Crafts catalyst with the temperature during the final stages of the condensation reaction raised to between 60–100° C. until the evolution of hydrogen chloride gases substantially ceases.

5. The method of producing a reaction product containing a high percentage of hexachlorocyclopentadiene comprising the steps of slowly introducing trichlorethylene over an extended period of time to carbon tetrachloride in the molar ratio of 5:1 to 1:17 while heating to reflux temperature to effect condensation in the presence of a Friedel-Crafts catalyst and produce a reaction product having a high concentration of molecules formed of 5–7 carbon atoms and 8–12 chlorine atoms, and then pyrolyzing the reaction product at a temperature between 280–800° C. to produce a pyrolytic reaction product containing a high concentration of hexachlorocyclopentadiene.

6. The method of producing a reaction product containing a high percentage of hexachlorocyclopentadiene comprising the steps of slowly introducing trichlorethylene over an extended period of time to carbon tetrachloride in the molecular ratio of 2:1 to 1:2 while heating to reflux temperature to effect condensation reaction in the presence of a Friedel-Crafts catalyst, maintaining the mixture under a constant state of agitation and continuing to heat the mixture after the addition of the trichlorethylene to a temperature which in the final stages of the condensation reaction rises to between 60–170° C. until the evolution of hydrogen chloride gases substantially ceases, and then heating the reaction product to a temperature between 280–800° C. to produce a pyrolytic reaction product containing a high concentration of hexachlorocyclopentadiene.

7. The method of producing a reaction product containing a high percentage of hexachlorocyclopentadiene comprising the steps of slowly introducing trichlorethylene over an extended period of time to carbon tetrachloride in the molecular ratio of 2:1 to 1:2 while heating to reflux temperature to effect condensation reaction in the presence of a Friedel-Crafts catalyst with the temperature during the final stages of the reaction rising to between 60–100° C. until the evolution of hydrogen chloride gases substantially ceases, and then pyrolyzing the reaction product at a temperature between 280–800° C. to produce a pyrolytic reaction product containing a high concentration of hexachlorocyclopentadiene.

8. The method of producing hexachlorocyclopentadiene comprising the steps of slowly introducing trichlorethylene over an extended period of time to carbon tetrachloride in the molecular ratio of 5:1 to 1:17 while heating to effect condensation reaction in the presence of a Friedel-Crafts catalyst with the temperature subsequent to the addition of the trichlorethylene being raised during the final stages of the condensation reaction to between 60–170° C. until the evolution of hydrogen chloride gases substantially ceases, pyrolyzing the reaction product while in a vapor phase at a temperature within the range of 280–800° C., and then separating the hexachlorocyclopentadiene from the pyrolytic reaction product.

9. The method of producing hexachlorocyclopentadiene comprising the steps of slowly introducing trichlorethylene over an extended period of time to carbon tetrachloride in the molecular ratio of 2:1 to 1:2 while heating to reflux temperature to effect condensation reaction in the presence of a Friedel-Crafts catalyst with the temperature subsequent to the addition of the trichlorethylene being raised during the final stages of the condensation reaction to between 60–100° C. until the evolution of hydrogen chloride gases substantially ceases, pyrolyzing the reaction product while in the vapor phase at a temperature within the range of 280–800° C., and then separating the hexachlorocyclopentadiene from the pyrolytic reaction product.

10. The method of producing hexachlorocyclopentadiene comprising the steps of slowly adding trichlorethylene over an extended period of time to carbon tetrachloride in the molecular ratio of 5:1 to 1:17 while heating to reflux temperature to effect condensation reaction in the presence of a Friedel-Crafts catalyst with the temperature during the final stages of the reaction subsequent to the addition of trichlorethylene being raised to between 60–170° C. until the evolution of hydrogen chloride gases substantially ceases, pyrolyzing the reaction product at a temperature within the range of 460–550° C., and then separating the hexachlorocyclopentadiene from the pyrolytic reaction product.

11. The method of producing hexachlorocyclopentadiene comprising the steps of slowly introducing trichlorethylene over an extended period of time to carbon tetrachloride in the molecular ratio of 2:1 to 1:2 while heating to reflux temperature to effect condensation reaction in the presence of a Friedel-Crafts catalyst with the temperature during the final stages of the reaction subsequent to the addition of trichlorethylene being raised to between 60–100° C. until the evolution of hydrogen chloride gases substantially ceases, pyrolyzing the reaction product at a temperature within the range of 460–550° C., and then separating the hexachlorocyclopentadiene from the pyrolytic reaction product.

JACK S. NEWCOMER.

REFERENCES CITED

The following references are of record in the file of this patent:

UNITED STATES PATENTS

| Number | Name | Date |
|---|---|---|
| 2,509,160 | McBee et al. | May 23, 1950 |

OTHER REFERENCES

Hurd, "The Pyrolysis of Carbon Compounds," pp. 140–3 (1929).

Prins, "Rec. des. Trav. Chim. des Pays Bas," vol. 51, pp. 1065–80 (1932).

Henne et al., "Jour. Am. Chem. Soc.," vol. 60, pp. 2491–5 (1938).

Krynitsky, "A Study of the Preparations and Properties of Some Highly Chlorinated Hydrocarbons," pp. 21–3 (Ph. D. Thesis, University of North Carolina, 1943).

Prins, "Rec. Trav. Chim. des Pays-Bas," vol. 65, pp. 455–67 (1946).

Krynitsky et al., "Jour. Am. Chem. Soc.," vol. 69, pp. 1918–20 (1947).